No. 760,965. PATENTED MAY 24, 1904.
J. F. CUNNINGHAM.
FLUSH TANK.
APPLICATION FILED JAN. 8, 1904.
NO MODEL.
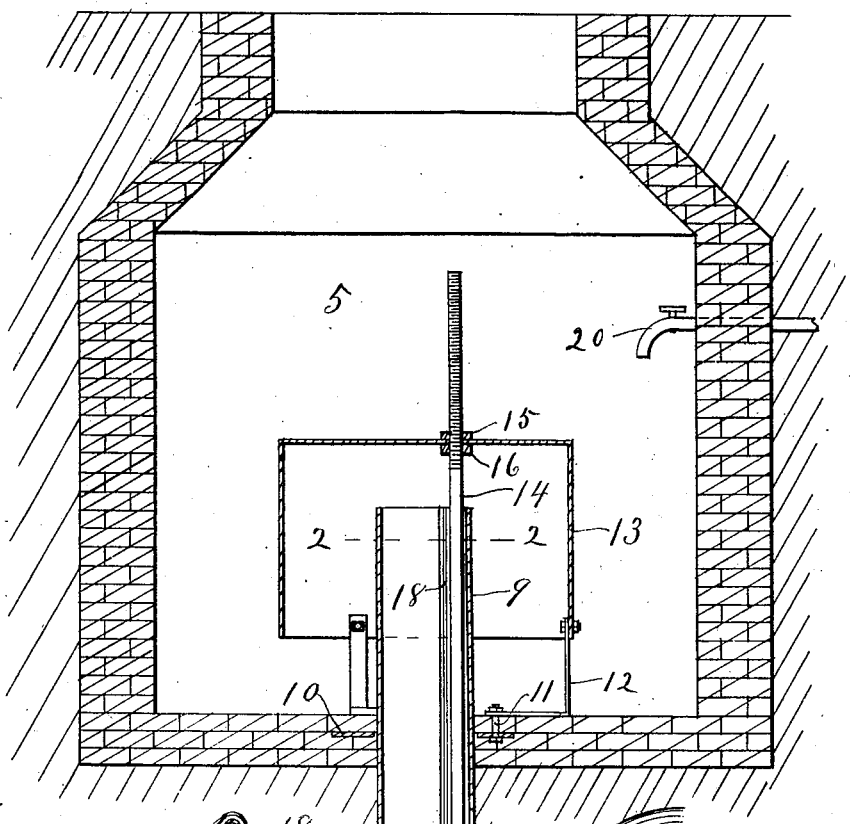
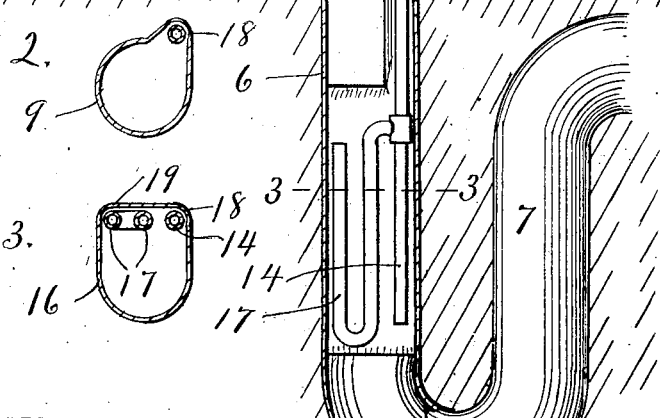
WITNESSES: INVENTOR.
S. G. Wells, John F. Cunningham,
Edw M Harrington BY Higdon & Longan & Hopkins,
ATTORNEYS.

No. 760,965. Patented May 24, 1904.

UNITED STATES PATENT OFFICE.

JOHN F. CUNNINGHAM, OF SPRINGFIELD, MISSOURI.

FLUSH-TANK.

SPECIFICATION forming part of Letters Patent No. 760,965, dated May 24, 1904.

Application filed January 8, 1904. Serial No. 188,259. (No model.)

*To all whom it may concern:*

Be it known that I, JOHN F. CUNNINGHAM, a citizen of the United States, residing at Springfield, Greene county, State of Missouri, have invented certain new and useful Improvements in Flush-Tanks, of which the following is a specification containing a full, clear, and exact description, reference being had to the accompanying drawings, forming a part hereof.

My invention relates to flush-tanks, my object being to construct a flush-tank which will be alternately charged and discharged solely by the action of the water and air, there being no floats or valves to get out of order; and my invention consists of the combination with a suitable receptacle having a supply-pipe leading into the receptacle and having a trap-siphon outlet, of an extension of the outlet above the floor of the receptacle, a cap over said extension with the lower edge of the cap below the upper edge of the extension, a blow-off pipe extending from near the lower end of the first leg of the siphon upwardly through the cap to the upper part of the receptacle, and a blow-off trap connected to the blow-off pipe at a point below the level of the upper end of the second leg of the siphon.

In the drawings, Figure 1 is a vertical central section of a flush-tank apparatus embodying the principles of my invention. Fig. 2 is a sectional detail on the line 2 2 of Fig. 1. Fig. 3 is a sectional detail on the line 3 3 of Fig. 1.

Referring to the drawings in detail, the receptacle 5 is a brick cistern embedded in the earth, and the trap-siphon outlet consists of the first leg 6, leading downwardly from the center of the cistern, and the second leg 7, leading upwardly from the lower end of the first leg. The siphon extension 9 projects into the receptacle a considerable distance. An anchor-plate 10, having anchor-bolts 11, is embedded in the masonry around the siphon, with the bolts extending into the tank, and the anchor-rods 12 are arranged radially around the extension 9 and are secured to the bolts 11 by nuts. The cap 13 is placed over the extension 9, with the lower edge of the cap below the upper edge of the extension, and said cap is secured to the anchor-rods 12 by bolts and nuts. The blow-off pipe 14 is open at both ends and is mounted with its lower end near the lower end of the first siphon-leg and extending upwardly through the cap 13 and to a point in the upper part of the receptacle, said pipe being held adjustably in position by the jam-nuts 15 and 16 engaging below and above the cap. The blow-off trap 17 is connected to the blow-off pipe 14 at a point just below the level of the upper end of the second leg 7. The first siphon-leg 6 and the extension 9 have an enlargement 18 to receive the blow-off pipe 14, and the siphon-leg has an additional enlargement 19 to receive the blow-off trap, so that the passage through the siphon will not be reduced by inserting the blow-off pipe and trap. The open end of the blow-off trap is below the level of the upper end of the second leg of the siphon. The supply-pipe 20 discharges into the receptacle.

In operation the trap-siphon and the blow-off trap are primed, then the supply-pipe is opened, and as the receptacle fills with water air is trapped in the cap, and as the water rises around the cap this air is compressed and forced into the siphon, and as the water continues to rise above the cap part of the water in the first leg of the siphon passes out, and the water in the blow-off trap is blown out into the blow-off pipe 14 and drops down in the first leg of the siphon, thus allowing the compressed air to pass up through the blow-off pipe and allowing the water to rush into the cap and flood the siphon extension and start the siphonic action, which continues until the water is lowered below the edge of the cap, thus admitting air and breaking the siphon, and then the operation is repeated. The water in the first leg of the siphon never gets below the bottom of the blow-off pipe 14.

The blow-off pipe and trap may be removed by removing the cap.

I claim—

1. A flush-tank, comprising the combination with a suitable receptacle, having a supply-pipe leading into the receptacle and having a trap-siphon outlet; of an extension of the outlet above the floor of the receptacle; a cap over said extension with the lower edge of the cap below the upper edge of the extension; a blow-off pipe extending from near the lower end of the first leg of the siphon upwardly through the cap to the upper part of the receptacle; and a blow-off trap connected to the blow-off pipe at a point below the level of the upper end of the second leg of the siphon, substantially as described.

2. A flush-tank, comprising the combination with a suitable receptacle, having a supply-pipe leading into the receptacle and having a trap-siphon outlet, of an extension of the outlet above the floor of the receptacle; a cap over said extension, a blow-off pipe extending from near the lower end of the siphon upwardly through the cap to the upper part of the receptacle, and a blow-off trap connected to the blow-off pipe, there being an enlargement in the siphon and extension to receive the blow-off pipe and trap, substantially as described.

3. A flush-tank, comprising the combination with a suitable receptacle having a means of supply and having a trap-siphon outlet; of a cap over the receiving end of the trap-siphon outlet; a blow-off pipe mounted with its lower end in the first leg of the trap-siphon and extending upwardly through the cap, said blow-off pipe being open at both ends; and a blow-off trap located in the first leg of the trap-siphon and connecting with the blow-off pipe at a point intermediate of its ends; substantially as specified.

In testimony whereof I have signed my name to this specification in presence of two subscribing witnesses.

JOHN F. CUNNINGHAM.

Witnesses:
ARCH A. JOHNSON,
W. A. UMBARGER.